US008279215B2

(12) United States Patent
Nam et al.

(10) Patent No.: US 8,279,215 B2
(45) Date of Patent: Oct. 2, 2012

(54) DISPLAY APPARATUS AND METHOD OF DRIVING THE SAME

(75) Inventors: Hyoung-Sik Nam, Incheon (KR); Jee-Hoon Jeon, Hwaseong-si (KR); Kwan-Young Oh, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 585 days.

(21) Appl. No.: 12/559,747

(22) Filed: Sep. 15, 2009

(65) Prior Publication Data

US 2010/0066723 A1 Mar. 18, 2010

(30) Foreign Application Priority Data

Sep. 18, 2008 (KR) ........................ 10-2008-0091722

(51) Int. Cl.
*G09G 5/00* (2006.01)
*G09G 3/36* (2006.01)
*G06F 3/038* (2006.01)

(52) U.S. Cl. ............................. 345/213; 345/94; 345/99

(58) Field of Classification Search ........................ None
See application file for complete search history.

(56) References Cited

U.S. PATENT DOCUMENTS

2008/0198120 A1* 8/2008 Senda et al. .................... 345/92
2008/0246752 A1* 10/2008 Lee ............................... 345/213

FOREIGN PATENT DOCUMENTS

JP 2008062466 3/2008
KR 100562860 3/2006
KR 100661828 12/2006

* cited by examiner

*Primary Examiner* — Daniell L Negron
(74) *Attorney, Agent, or Firm* — Cantor Colburn LLP

(57) ABSTRACT

A display apparatus includes a timing controller, a column driver, a row driver and a display unit. The timing controller outputs a first column clock embedded into image data during an active period, and outputs a second column clock embedded into blank data during a blank period. The column driver detects the first column clock and the image data and converts the image data into a first analog signal using the first column clock, and detects the second column clock and the blank data and converts the blank data into a second analog signal using the second column clock. The first column clock has a voltage level greater than a voltage level of the image data. The second column clock is embedded into the blank data and has a voltage level substantially the same as the voltage level of the image data.

20 Claims, 7 Drawing Sheets

DISPLAY APPARATUS AND METHOD OF DRIVING THE SAME

This application claims priority to Korean Patent Application No. 2008-91722, filed on Sep. 18, 2008, and all the benefits accruing therefrom under 35 U.S.C. §119, the contents of which in its entirety are herein incorporated by reference.

BACKGROUND OF THE INVENTION

1. Field of the Invention

The present invention relates to a display apparatus and a method of driving the same. More particularly, the present invention relates to a display apparatus which transmits internal data using a multi-level signal transmission scheme and a method of driving the display apparatus.

2. Description of the Related Art

IN general, a display apparatus includes a timing controller, a source driver and a display panel. A column driver drives the display panel based on image data and a control signal which controls the image data. The image data and the control signal are typically supplied from the timing controller. The source driver receives the image data and the control signal from the timing controller via a plurality of interconnections.

Recently, an interface scheme, having a combination of a transmission scheme to embed a clock signal into the image data and a transmission scheme to transmit a signal level of the clock signal through multi-level signaling, has been developed to minimize a number of interconnections required between the timing controller and the source driver.

In the display apparatus, the timing controller transmits the image data to the source driver during an active period of one horizontal scan time, and does not transmit the image data to the source driver during a blank period of the one horizontal scan time.

However, when a supply voltage which drives the source driver includes ripple components, the ripple components are transferred to the embedded clock signal transmitted through the multi-level signaling during the blank period, and a voltage level of the clock signal is distorted. As a result, the source driver does not accurately receive and/or determine a level the clock signal.

Thus, it is desired to develop a display apparatus which effectively overcomes the abovementioned problems.

BRIEF SUMMARY OF THE INVENTION

An exemplary embodiment of the present invention provides a display apparatus having, among other advantages, substantially reduced and/or effectively prevented errors in an embedded column clock signal.

An alternative exemplary embodiment of the present invention provides a method of driving the display apparatus.

In an exemplary embodiment of the present invention, a display apparatus includes a timing controller, a column driver, a row driver and a display unit. The timing controller outputs image data and a first column clock during an active period, the first column clock being embedded into the image data and having a voltage level which is greater than a voltage level of the image data. The timing controller outputs blank data and a second column clock during a blank period, the second column clock being embedded into the blank data and having a voltage level which is substantially the same as the voltage level of the image data.

The column driver detects the first column clock and the image data during the active period and converts the image data into a first analog signal using the first column clock. In addition, the column driver detects the second column clock and the blank data during the blank period and converts the blank data into a second analog signal using the second column clock.

The row driver outputs a scan signal based on a control signal received from the timing controller.

The display unit displays an image based on the first analog signal, and a black image based on the second analog signal.

In an alternative exemplary embodiment of the present invention, a method of driving the display apparatus includes: generating image data and a first column clock during an active period, the first column clock being embedded into the image data and having a voltage level greater than a voltage level of the image data, and generating blank data and a second column clock during a blank period, the second column clock being embedded into the blank data and having a voltage level substantially the same as the voltage level of the image data; detecting the image data and the first column clock during the active period; detecting the blank data and the second column clock during the blank period; converting the image data into a first analog signal using the first column clock during the active period; converting the blank data into a second analog signal using the second column clock during the blank period; displaying an image in response to the first analog signal; and displaying a black image in response to the second analog signal.

In yet another alternative exemplary embodiment of the present invention, display apparatus includes: a timing controller which outputs a first column clock and image data corresponding to an image during an active period in which the image is displayed, the first column clock being embedded into the image data and having a voltage level greater than a voltage level of the image data, and which outputs blank data and a second column clock during a blank period in which the image is not displayed, the second column clock being embedded into the blank data; a column driver which detects the first column clock and the image data during the active period and converts the image data into a first analog signal using the first column clock, and which detects the second column clock and the blank data during the blank period and converts the blank data into a second analog signal using the second column clock; a row driver which outputs a scan signal in response to a control signal of the timing controller; and a display unit which displays the image in response to the first analog signal, and which displays a black image in response to the second analog signal. Levels of the first column clock and the second column clock are different.

Thus, according to exemplary embodiments of the present invention, a second column clock having a voltage substantially the same as a voltage of image data is embedded into a blank data during a blank period of one horizontal scan period. As a result, errors in the second column clock, caused by a ripple component of an analog supply voltage during the blank period, are substantially reduced and/or effectively prevented from being generated.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

Figure 1:
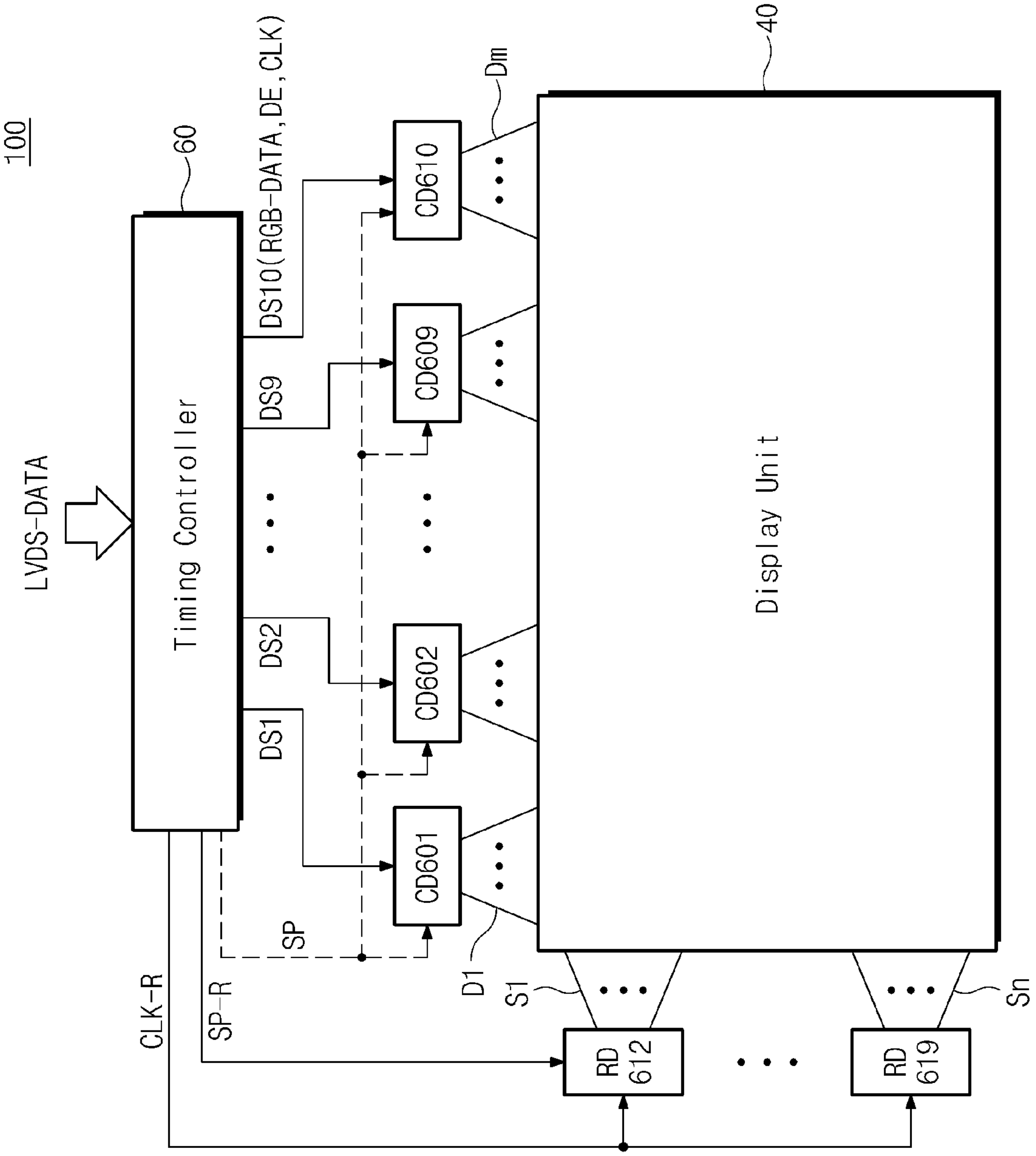
FIG. 1 is a block diagram showing an exemplary embodiment of a display apparatus according to the present invention.

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be present therebetween. In contrast, when an element is referred to as being “directly on” another element, there are no intervening elements present. As used herein, the term “and/or” includes any and all combinations of one or more of the associated listed items.

It will be understood that although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms “a”, “an” and “the” are intended to include the plural forms as well, unless the context clearly indicates otherwise. It will be further understood that the terms “comprises” and/or “comprising,” or “includes” and/or “including,” when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as “lower” or “bottom” and “upper” or “top” may be used herein to describe one element’s relationship to other elements as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on the “upper” side of the other elements. The exemplary term “lower” can, therefore, encompass both an orientation of “lower” and “upper,” depending upon the particular orientation of the figure. Similarly, if the device in one of the figures were turned over, elements described as “below” or “beneath” other elements would then be oriented “above” the other elements. The exemplary terms “below” or “beneath” can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

FIG. 1 is a block diagram showing an exemplary embodiment of a display apparatus according to the present invention.

Referring to FIG. 1, a display apparatus 100 according to an exemplary embodiment includes a display unit 40, a timing controller 60, column drivers CD601 to CD610 and row drivers RD612 to RD619.

The display unit 40 displays an image in response to, e.g., based on, scan signals S1 to Sn from the row drivers RD612 to RD619, as well as data signals D1 to Dm from the column drivers CD601 to CD610. In an exemplary embodiment, for example, the display unit 40 includes an a liquid crystal display (“LCD”) panel, a plasma display panel (“PDP”) or an organic light emitting diode (“OLED”) panel, but alternative exemplary embodiments are not limited thereto.

The timing controller 60 receives input data LVDS-DATA from an external source (not shown). In an exemplary embodiment the input data LVDS-DATA includes image data and a control signal to control input timing of the image data. For example, the input data LVDS-DATA may be transmitted to the timing controller 60 from the external source using a low voltage differential signaling (“LVDS”) scheme.

The timing controller 60 outputs differential swing data DS1 to DS10, a row clock CLK-R, a row start pulse SP-R and a column start pulse SP in response to the input data LVDS-DATA.

In an exemplary embodiment, the differential swing data DS1 to DS10 are transmitted to the column drivers CD601 to CD610 using a point-to-point transmission scheme, for example. Further, the differential swing data DS1 to DS10 include image data RGB-DATA corresponding to an image, a data enable signal DE and a column clock CLK. In an exemplary embodiment, the image data RGB-DATA, the data enable signal DE and the column clock CLK are transmitted in a form of a data stream through one transmission line. In addition, the differential swing data DS1 to DS10 support an advanced intra panel interface ("AiPi").

An active period is determined, e.g., is defined by, the data enable signal DE. In the active period, the image data RGB-DATA are transmitted to the display unit 40 during one horizontal scan time 1H (FIG. 3), e.g., during or for one horizontal scan line 1H. The data enable signal DE also defines a blank period in which the image data RGB-DATA are not transmitted to the display unit 40. Hereinafter, a term "first column clock" will be used to refer to an embedded column clock CLK during the active period, and a term "second column clock signal" will be used to refer to an embedded column clock CLK during the blank period. In addition, the first column clock and the second column clock may be collectively referred to as the column clock CLK.

During the active period, the first column clock CLK according to an exemplary embodiment controls input timing of the image data RGB-DATA, and is embedded into the image data RGB-DATA. In addition, the first column clock CLK includes a signal level, e.g., a voltage level, which is greater than a signal level, e.g., a voltage level, of the image data RGB-DATA. During the blank period, the second column clock CLK has substantially the same signal level as the signal level of the image data RGB-DATA. Thus, the timing controller 60 transmits the first column clock CLK having a signal level greater than that of the image data RGB-DATA to the column drivers CD601 to CD610 during the active period, and transmits the second column clock CLK having substantially the same signal level as that of the image data RGB-DATA to the column drivers CD601 to CD610 during the blank period.

Accordingly, the column drivers CD601 to CD610, which receive the first column clock CLK and the second column clock CLK, substantially reduce and/or effectively prevent errors from occurring when recovering, e.g., sensing, the second column clock CLK from the differential swing data DS1 to DS10 transmitted in the form of a data stream during the blank period, as will be described in further detail below.

The timing controller 60 outputs the differential swing data DS1 to DS10, in units of one horizontal scan line 1H, and transmits the swing data DS1 to DS10 to the column drivers CD601 to CD610 using a point-to-point transmission scheme, for example. The column drivers CD601 to CD610 receive the column start pulse SP from the timing controller 60. In addition, the column start pulse SP may be transmitted to the column drivers CD601 to CD610 using a signal transmission scheme which is different from the point-to-point transmission scheme. As shown in FIG. 1, for example, the column start pulse SP is transmitted to the column drivers CD601 to CD610 through a multi-drop transmission scheme, but alternative exemplary embodiments are not limited thereto.

The column drivers CD601 to CD610 apply the data signals D1 to Dm to the display unit 40 in response to the differential swing data DS1 to DS10, respectively. More specifically, the column drivers CD601 to CD610 transmit the differential swing data DS1 to DS10 to the display unit 40 in response to the column start pulse SP. The column drivers CD601 to CD610 detect the image data RGB-DATA and the first column clock CLK from the differential swing data DS1 to DS10 transmitted in the form of a data stream. The column drivers CD601 to CD610 distinguish between the first column clock CLK and the image data RGB-DATA based on a level difference between the image data RGB-DATA and the first column clock CLK embedded in the image data RGB-DATA.

The row drivers RD612 to RD619 supply the scan signals S1 to Sn to the display unit 40 in response to the row clock CLK-R and the row start pulse SP-R received from the timing controller 60.

Figure 2:
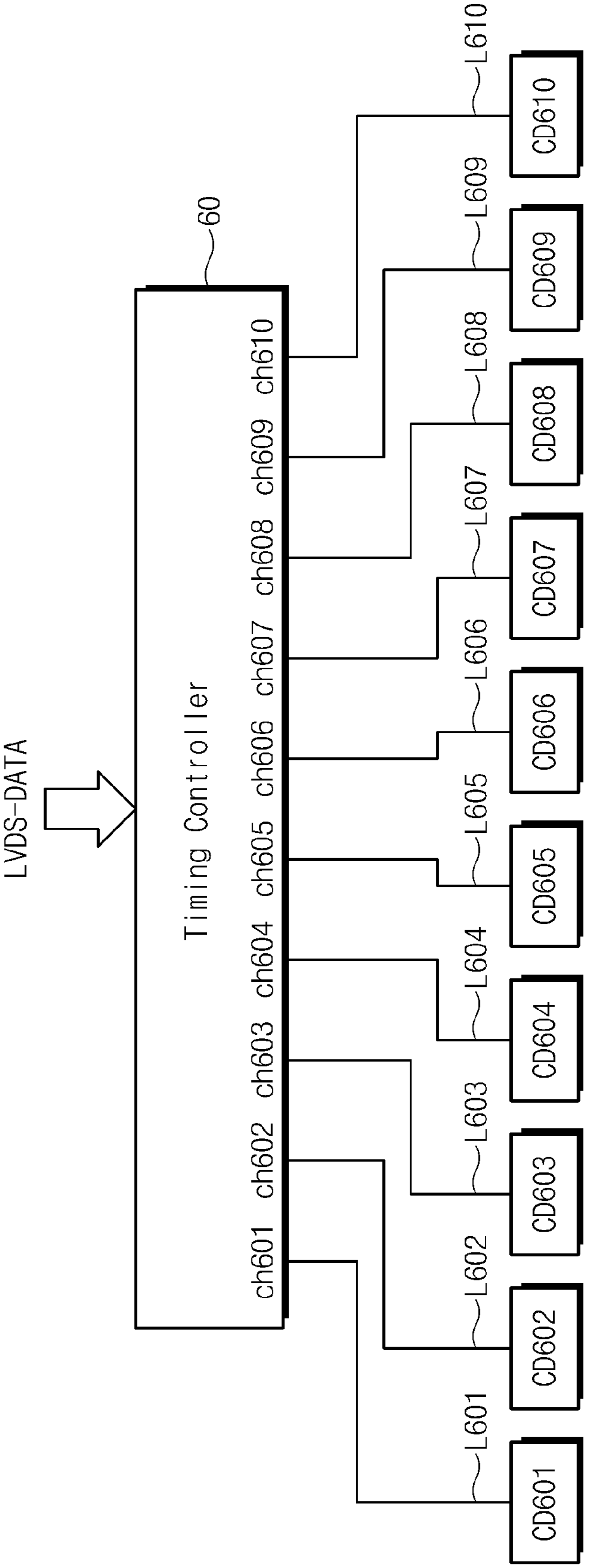
FIG. 2 is a block diagram showing an exemplary embodiment of interconnections between a timing controller and column drivers of the display apparatus shown in FIG. 1.

FIG. 2 is a block diagram showing an exemplary embodiment of interconnections between the timing controller 60 and the column drivers CD601 to CD610 shown in FIG. 1.

More specifically, FIG. 2 shows the timing controller 60, a channels ch601 to ch610, transmission lines L601 to L610, and the column drivers CD601 to CD610.

The timing controller 60 controls outputs of the channels ch601 to ch610, and transmits the image data RGB-DATA to the column drivers CD601 to CD610 via the transmission lines L601 to L610.

As shown in FIG. 2, an exemplary embodiment includes ten column drivers CD601 to CD610, but alternative exemplary embodiments are not limited thereto. Each of the column drivers CD601 to CD610 is connected to the timing controller 60 through a single, e.g., only one, of the transmission lines L601 to L610. Accordingly, in an exemplary embodiment, an additional transmission line used to transmit a control signal such as the data enable signal DE is not required. Thus, only ten transmission lines L601 to L610 are required.

Figure 3:
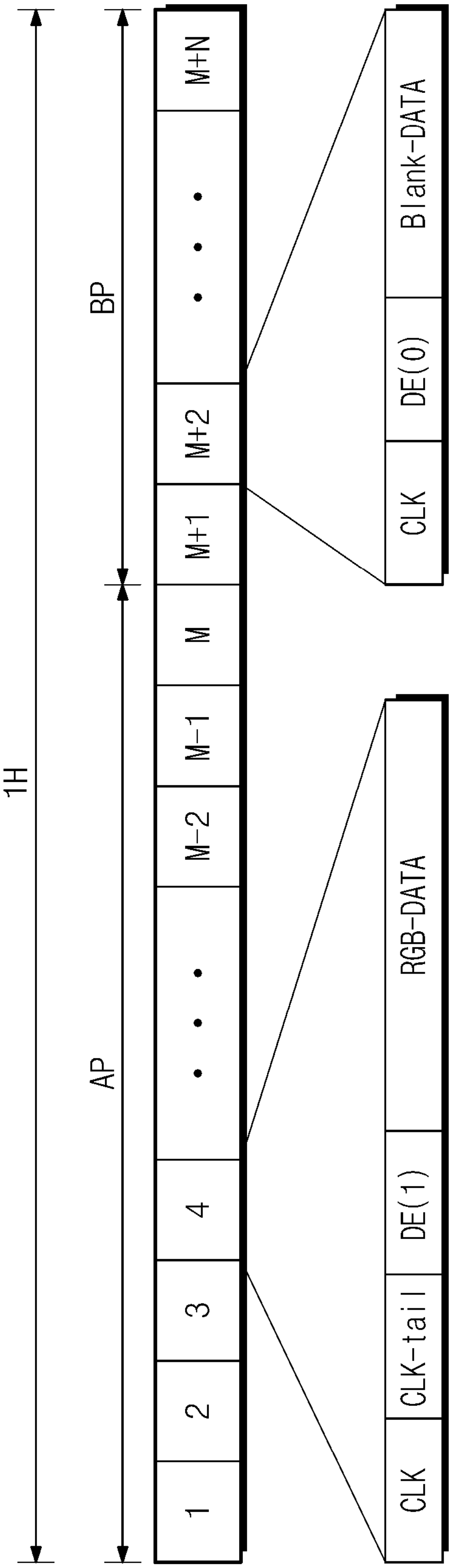
FIG. 3 is a signal timing diagram showing an exemplary embodiment of a data format of data transmitted to the column driver from the timing controller shown in FIG. 2.
Figure 4:
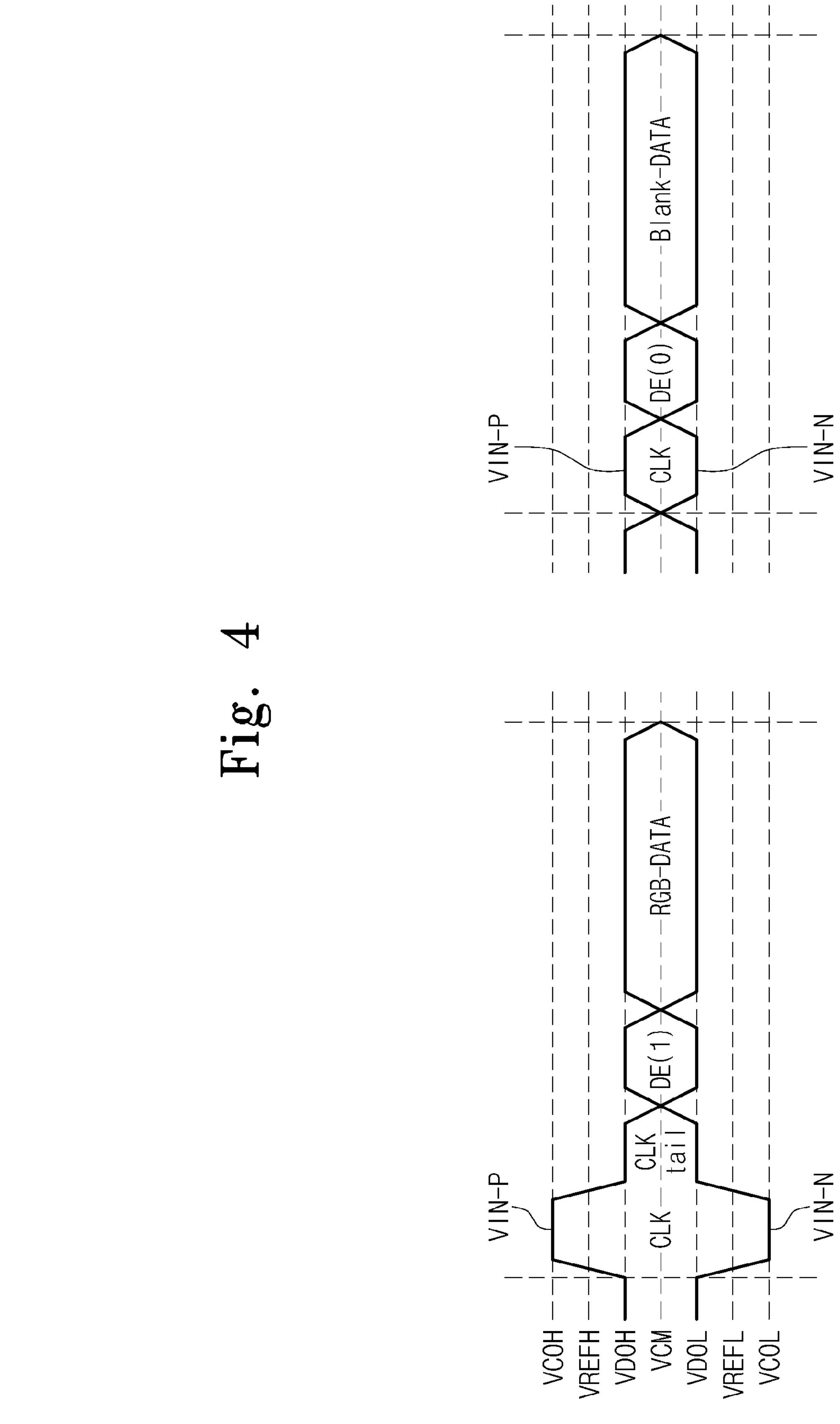
FIG. 4 is a signal timing diagram showing an exemplary embodiment of a multi-level signaling scheme for transmission of a signal having the data format of the exemplary embodiment shown in FIG. 3.

FIG. 3 is a signal timing diagram showing an exemplary embodiment of a data format of data transmitted to the column drivers CD601 to CD610 from the timing controller 60 shown in FIG. 2, and FIG. 4 is a signal timing diagram showing an exemplary embodiment of a multi-level signaling scheme for transmission of a signal having the data format of the display apparatus shown in FIG. 3.

As shown in FIG. 3, an exemplary embodiment of the present invention includes three data formats. The data format shown in a top portion of FIG. 3 is transmitted to each of the column drivers CD601 to CD610 from the timing controller 60 during one horizontal scan time 1H.

The data format transmitted from the timing controller 60 to the each of the column drivers CD601 to CD610 during one horizontal scan time 1H includes an active period AP and a blank period BP. As described in greater detail above, the active period AP is a period in which the image data RGB-DATA are transmitted from the timing controller 60 to the column drivers CD601 to CD610, and the blank period BP is a period in which the image data RGB-DATA are not transmitted. In an exemplary embodiment, for example, the active period AP may include M pixel periods, e.g., active periods AP (thus 1 to M active periods AP), and the blank period BP may include N blank pixel periods (e.g., M+1 to M+N blank periods BP). In an exemplary embodiment, M is a natural number greater than 1, and N is a natural number less than M.

Two data formats are shown at a lower portion of FIG. 3. A left data format among the two data formats shown in the bottom portion of FIG. 3 is transmitted during each active period AP, and a right data format among the two data formats is transmitted during each blank period BP.

Referring to FIGS. 3 and 4, the timing controller 60 converts voltages of the data enable signal DE and the image data RGB-DATA into voltages (e.g. a third reference voltage VDOH and a fourth reference voltage VDOL) having an absolute value less than a first reference voltage VREFH and a second reference voltage VREFL, and converts voltages of the first column clock CLK into voltages (e.g., a fifth reference voltage VCOH and a sixth reference voltage VCOL) having an absolute value greater than the first reference voltage VREFH and the second reference voltage VREFL during each active period AP. The first reference voltage VREFH is a voltage level having a positive polarity relative to a common voltage VCM and the second reference voltage VREFL is voltage level having a negative polarity relative to the common voltage VCM. Thereafter, the timing controller 60 transmits the first column clock CLK by embedding the first column clock CLK into the image data RGB-DATA.

In addition, the timing controller 60 converts the voltages of the data enable signal DE and blank data Blank-DATA into voltages (e.g., a third reference voltage VDOH and a fourth reference voltage VDOL) having the absolute value less than the first reference voltage VREFH and the second reference voltage VREFL during each blank period BP, and converts the voltage of the second column clock CLK into a voltage identical to, e.g., substantially the same as, the voltage of the image data RGB-DATA during each blank period BP. Thus, the timing controller 60 converts the voltage of the second column clock CLK into a voltage having a level less than the first reference voltage VREFH and the second reference voltage VREFL during the blank period BP. Thereafter, the timing controller 60 transmits the second column clock CLK having the voltage level identical to, e.g., substantially the same as, that of the image data RGB-DATA by embedding the second column clock CLK into the blank data Blank-DATA.

In the active period AP, a clock tail CLK-tail is dummy bit for securing sufficient rising or falling time and stable operation.

The data enable signal DE maintains a logic high value DE(1), e.g., a logic level 1 (one), during each pixel period of the active period AP, and maintains a logic low value DE(0), e.g., a logic level 0 (zero), during each blank pixel period of the blank period BP. Thus, the active period AP and the blank period BP are distinguished from each other according to a logic state of the data enable signal DE.

The column drivers CD601 to CD610 detect the image data RGB-DATA and the first column clock CLK from the differential swing data DS1 to DS10 through differential signaling.

In an exemplary embodiment, the differential swing data DS1 to DS10 from the timing controller 60 are transmitted to the column drivers CD601 to CD610 with two voltage levels having different polarities. Specifically, the differential swing data DS1 to DS10 include a first voltage VIN-P having a positive polarity and a second voltage VIN-N having a negative polarity.

In a period in which an absolute value |VIN-P-VIN-N| of a voltage difference between the first voltage VIN-P and the second voltage VIN-N is less than an absolute value |VREFH-VREFL| of a voltage difference between the first reference voltage VREFH and the second reference voltage VREFL (e.g., |VIN-P-VIN-N|<|VREFH-VREFL|), the column drivers CD601 to CD610 determine the differential swing data DS1 to DS10 based on the image data RGB-DATA.

In addition, when an absolute value |VIN-P| of the first voltage VIN-P is greater than an absolute value |VIN-N| of the second voltage VIN-N, the column drivers CD601 to CD610 determine that the image data RGB-DATA has a high logic value (e.g., of "1"). Likewise, when the absolute value |VIN-P| of the first voltage VIN-P is less than the absolute value |VIN-N| of the second voltage VIN-N, the column drivers CD601 to CD610 determine that the image data RGB-DATA has a low logic value (e.g., of "0"). The logic value of "1" or the logic value of "0" determines whether the column drivers CD601 to CD610 recognize the image data RGB-DATA as a "1" or a "0", which is a digital signal which forms the image data RGB-DATA.

In a period in which the absolute value |VIN-P-VIN-N| of voltage difference between the first voltage VIN-P and the second voltage VIN-N is greater than the absolute value |VREFH-VREFL| of voltage difference between the first reference voltage VREFH and the second reference voltage VREFL (|VIN-P-VIN-N|>|VREFH-VREFL|), the column drivers CD601 to CD610 determine that the differential swing data DS1 to DS10 is the first column clock CLK.

Similarly, the column drivers CD601 to CD610 detect the data enable signal DE. In addition, the column drivers CD601 to CD610 detect a logic state DE(1) or DE(0) of the data enable signal DE.

As described in greater detail above, in an exemplary embodiment, a voltage level of the first column clock CLK transmitted during the active period AP is different from a voltage level of the second column clock CLK transmitted during the blank period BP. Thus, the timing controller 60 transmits the first column clock CLK having a voltage level greater than that of the image data RGB-DATA during the active period AP, and transmits the second column clock CLK having a voltage level identical to, e.g., substantially the same as, that of the image data RGB-DATA during the blank period BP. Merely, the timing controller 60 transmits the first column clock CLK during a first blank data period M+1 of the blank period BP. In detail, the timing controller 60 transmits the first column clock CLK during the first blank data period M+1 to distinguish from the image data RGB-DATA having the logic value of "0" since the blank period BP is defined by the data enable signal DE having the logic value of "0". If the timing controller 60 transmits the second column clock CLK during the first blank data period M+1, the second column clock CLK cannot distinguish from the image data RGB-DATA having the logic value of "0" during the first blank data period M+1.

The timing controller 60 transmits the second column CLK during a second blank data period M+2 of the blank period BP.

As described herein, the timing controller 60 transmits the second column clock CLK having the voltage level identical to that of the image data RGB-DATA during the blank period BP, thereby solving at least the problems which will now be described in further detail with reference to FIG. 5.

Figure 5:
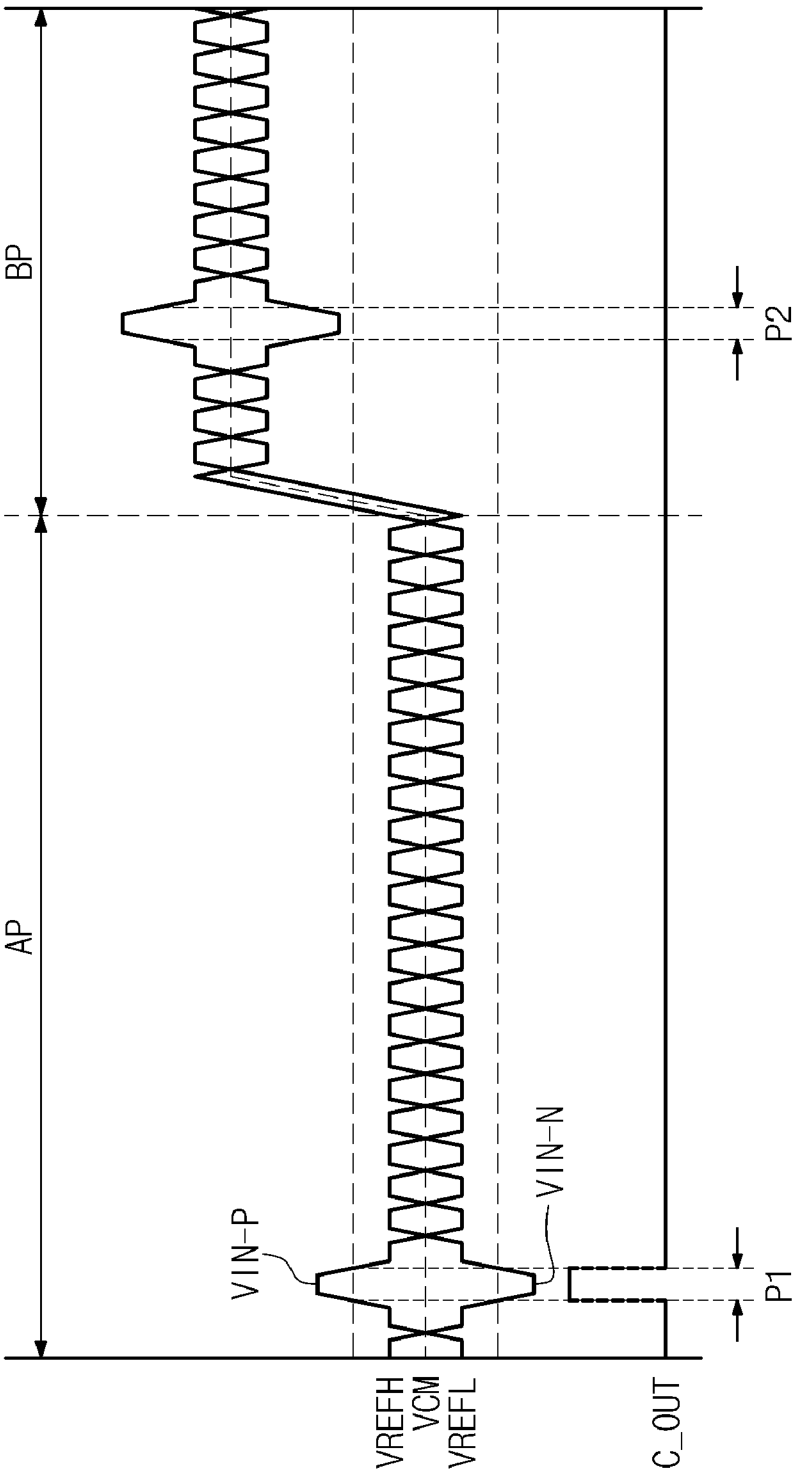
FIG. 5 is a signal timing diagram showing data of a column clock transmitted through a multi-level signaling scheme during a blank period shown in FIGS. 3 and 4.

FIG. 5 is a signal timing diagram showing data of the column clock CLK transmitted through a multi-level signaling during the blank period BP shown in FIGS. 3 and 4.

Referring to FIG. 5, during the active period AP, a common voltage VCM of the first voltage VIN-P and the second voltage VIN-N of the differential swing data DS1 to DS10 received from the timing controller 60, which is a transmit terminal, has substantially the same level as that of an average voltage of the first reference voltage VREFH and the second reference voltage VREFL. Accordingly, in a period P1 in which the column clock CLK is embedded, the first voltage VIN-P has a level greater than that of the first reference voltage VREFH, and the second voltage VIN-N has a level less than that of the second reference voltage VREFL. Therefore, the column drivers CD601 to CD610, which are receive terminals, determine the column clock CLK as an output pulse C_OUT having a logic value of "1" during the period P1 in which column clock CLK is embedded. In addition, in a remaining portion of active period AP excluding the period P1, the column drivers CD601 to CD610, which are receive terminals, determine the column clock CLK as the output pulse C_OUT having a logic value of "0".

During the blank period BP, the common voltage VCM of the first voltage VIN-P and the second voltage VIN-N of the differential swing data DS1 to DS10 received from the timing controller 60 may be greater than an average voltage of the first reference voltage VREFH and the second reference voltage VREFL. In other words, the common voltage VCM swings during the blank period BP, as shown in FIG. 4. This is because the column drivers CD601 to CD610 use an analog supply voltage supplied from an external voltage source (not shown) to drive a liquid crystal panel (not shown) of the display apparatus 100. The analog supply voltage is not supplied to the column drivers CD601 to CD610 during the blank period BP. Instead, the analog supply voltage is supplied to the column drivers CD601 to CD610 when the blank period BP is ended. Thus, the analog supply voltage is boosted to a normal voltage level when the blank period BP ends. In this case, a ripple in which the analog supply voltage is swung around the normal voltage level occurs.

When the ripple of the analog supply voltage exerts an influence on the differential swing data DS1 to DS10 received from the column drivers CD601 to CD610, the common voltage VCM swings, as described above. In other words, as shown in FIG. 5, during the blank period BP, in the second period P2 in which the column clock CLK is embedded, the first voltage VIN-P of the differential swing data DS1 to DS10 is greater than the first reference voltage VREFH, and the second voltage VIN-N of the differential swing data DS1 to DS10 is greater than that of the second reference voltage VREFL unlike the first period P1 of the active period AP. In this case, the column drivers CD601 to CD610 which serve as receive terminals do not detect the column clock CLK transmitted during the blank period BP. Accordingly, the column drivers CD601 to CD610 do not accurately recover, e.g., sense, the column clock CLK in the differential swing data DS1 to DS10 corresponding to the second period P2 in which the column clock CLK is embedded during the blank period BP.

When the differential swing data DS1 to DS10 are transmitted through multi-level signaling, the column drivers CD601 to CD610, which serve as the receive terminals, determine the column clock CLK based on the first and second reference voltages VREFH and VREFL.

The image data RGB-DATA are detected by using only difference between the first voltage VIN-P and the second voltage VIN-N of the differential swing data DS1 to DS10. In contrast, the column clock CLK is detected through the first reference voltage VREFH and the second reference voltage VREFL. Accordingly, as shown in FIG. 5, when the common voltage VCM of the first voltage VIN-P and the second voltage VIN-N corresponding to the second period P2 is different than the average voltage of the first reference voltage VREFH and the second reference voltage VREFL, the column drivers CD601 to CD610 do not accurately detect the column clock CLK.

To solve the abovementioned problems, exemplary embodiments of the present invention provide the timing controller 60 which embeds the column clock CLK into the blank data Blank-DATA with voltage levels substantially the same as the first voltage level VIN-P and the second voltage level VIN-N of the image data RGB-DATA to transmit the column clock CLK to the column drivers CD601 to CD610 during the blank period BP. Accordingly, the column drivers CD601 to CD610, which are receive terminals, accurately detect the column clock CLK using the voltage difference between the voltage levels of the column clock CLK transmitted during the blank period BP. In other words, during the blank period BP, the column drivers CD601 to CD610 detect the column clock CLK similarly to detecting the image data RGB-DATA. Accordingly, during the blank period BP, the column clock CLK is transmitted through multi-level signaling, and the column drivers CD601 to CD610 thereby precisely detect the column clock CLK during the blank period BP.

Figure 6:
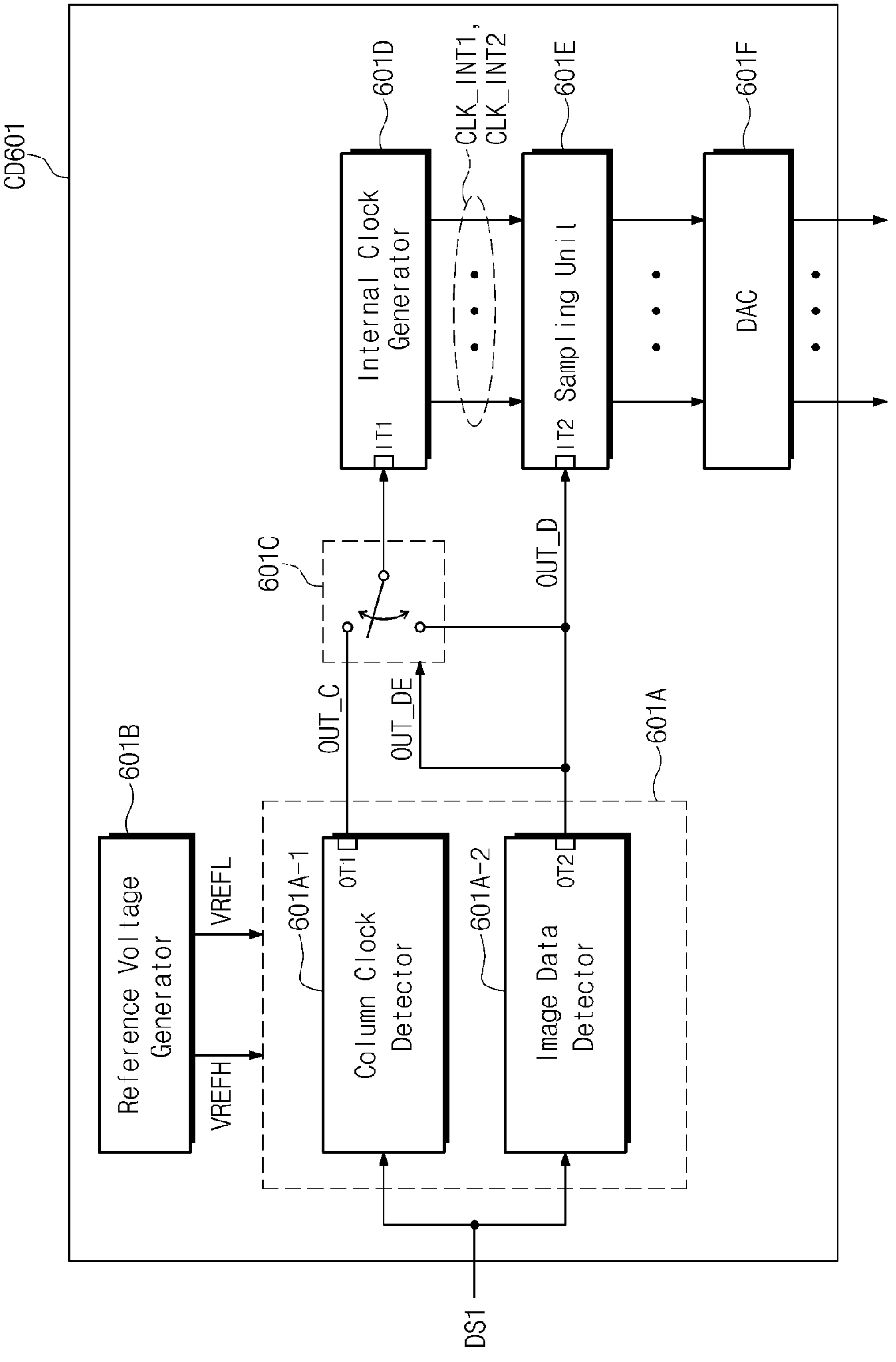
FIG. 6 is a block diagram showing an exemplary embodiment of a column driver of the display apparatus shown in FIG. 1.

FIG. 6 is a block diagram showing an exemplary embodiment of an internal structure of the column drivers CD601 to CD610 of the display apparatus according to the exemplary embodiment shown in FIG. 1. For purposes of illustration, only a first column driver CD601 of the column drivers CD601 to CD610 (FIG. 1) is shown in FIG. 6. However, it will be noted that the column drivers CD601 to CD610 shown in FIG. 1 have substantially the same structure and/or function as the first column driver CD601. Accordingly, repetitive details of the column drivers CD602 to CD610 will hereinafter be omitted to avoid redundancy. In addition, to simplify FIG. 6, the column start pulse SP (FIG. 1) is not shown. However, as described in greater detail above, the column start pulse SP is applied to the first column driver CD601 through an additional signal line separate from a signal line which delivers the differential swing data DS1 to DS10 to the column drivers CD601 to CD610.

Referring to FIG. 6, the first column driver CD601 includes a multi-level detector 601A, a reference voltage generator 601B, a switching unit 601C, an internal clock generator 601D, a sampling unit 601E and a digital-to-analog converter ("DAC") 601F.

The multi-level detector 601A receives the differential swing data DS1 from the timing controller 60 to detect the image data RGB-DATA, the data enable signal DE and the column clock CLK based on the differential swing data DS1.

The multi-level detector 601A includes a column clock detector 601A-1 and an image data detector 601A-2.

The column clock detector 601A-1 outputs a clock pulse OUT_C having a logic value of "0" when the absolute value |VIN-P-VIN-N| of a difference between the first voltage VIN-P and the second voltage VIN-N of the differential swing data DS1 is less than the absolute value |VREFH-VREFL| of a difference between the first reference voltage VREFH and the second reference voltage VREFL. In contrast, the column clock detector 601A-1 outputs the clock pulse OUT_C having a logic value of "1" when the absolute value |VIN-P-VIN-N| of difference between the first voltage VIN-P and the second voltage VIN-N is greater than the absolute value |VREFH-VREFL| of the difference between the first reference voltage VREFH and the second reference voltage VREFL. Thus, when the absolute value |VIN-P-VIN-N| of difference between the first voltage VIN-P and the second voltage VIN-N is greater than the absolute value |VREFH-VREFL| of the difference between the first reference voltage VREFH and the second reference voltage VREFL, the column clock detector 601A-1 determines the differential swing data DS1 as the column clock CLK.

If the absolute value |VIN-P-VIN-N of the difference between the first voltage VIN-P and the second voltage VIN-N is less than the absolute value |VREFH-VREFL| of the difference between the first reference voltage VREFH and the second reference voltage VREFL, the image data detector 601A-2 determines the differential swing data DS1 as the image data RGB-DATA. In this case, the logic value of the image data RGB-DATA is determined according to a voltage difference (e.g., a positive voltage or a negative voltage) between the first voltage VIN-P and the second voltage VIN-N. The image data detector 601A-2 thereafter outputs the image data RGB-DATA having a determined logic value as a data pulse OUT_D.

Similarly, the image data detector 601A-2 outputs the data enable signal DE having a determined logic value as a data enable pulse OUT_DE. Specifically, the image data detector 601A-2 outputs the data enable pulse OUT_DE as a logic value of "1" during the active period AP, and outputs the data enable pulse OUT_DE as a logic value of "0" during the blank period BP.

In addition, during the blank period BP, the column clock CLK is transmitted with a voltage level identical to, e.g., substantially the same as, a voltage level of the image data RGB-DATA. Accordingly, the image data detector 601A-2 outputs the column clock CLK as the data pulse OUT_D. The data pulse OUT_D, output from the image data detector 601A-2 during the blank period BP, is the clock pulse OUT_C corresponding to the column clock CLK instead of a data pulse corresponding to the image data RGB-DATA.

The reference voltage generator 601B generates the first reference voltage VREFH and the second reference voltage VREFL, and transmits the first reference voltage VREFH and the second reference voltage VREFL to the multi-level detector 601A.

The switching unit 601C controls a connection between an output terminal OT1 of the column clock detector 601A-1 and an input terminal IT1 of the internal clock generator 601D according to a logic state of the data enable pulse OUT_DE supplied from the image data detector 601A-2. More particularly, when the data enable pulse OUT_DE has a logic value of "1" (representing the active period AP) is applied to the switching unit 601C, the switching unit 601C connects the output terminal OT1 of the column clock detector 601A-1 to the input terminal IT1 of the internal clock generator 601D. Thus, an output terminal OT2 of the image data detector 601A-2 which outputs the data pulse OUT_D is electrically connected to an input terminal IT2 of the sampling unit 601E.

Conversely, when the data enable pulse OUT_DE has a logic value of "0" (representing the blank period BP) is applied to the switching unit 601C, the switching unit 601C electrically disconnects the output terminal OT1 of the column clock detector 601A-1 from the input terminal IT1 of the internal clock generator 601D, and electrically connects the output terminal OT2 of the image data detector 601A-2 to the input terminal IT1 of the internal clock generator 601D. Thus, during the blank period BP, the output terminal OT2 of the image data detector 601A-2 is connected to the input terminal IT1 of the internal clock generator 601D and the input terminal IT2 of the sampling unit 601E.

The internal clock generator 601D generates first internal clocks CLK-INT1 in response to the clock pulse OUT_C output from the column clock detector 601A-1 during the active period AP. In addition, the internal clock generator 601D generates second internal clocks CLK-INT2 in response to the data pulse OUT_D corresponding to the column clock CLK during the blank period BP. In an exemplary embodiment, for example, the internal clock generator 601D may be a phase locked loop ("PLL") or, alternatively, a delay locked loop ("DLL").

The sampling unit 601E performs sampling on the data pulse OUT_D corresponding to the image data RGB-DATA using the first internal clocks CLK-INT1 supplied from the internal clock generator 601D during the active period AP. In addition, the sampling unit 601E performs sampling on the data pulse OUT_D corresponding to the blank data Blank-DATA using the second internal clocks CLK-INT2 supplied from the internal clock generator 601D during the blank period BP. The sampling unit 601E outputs digital data, sampled during the active period AP, in parallel. In an exemplary embodiment, for example, when the image data RGB-DATA includes 10-bit red data R-DATA[0:9], 10-bit green data G-DATA[0:9], and 10-bit blue data B-DATA[0:9], the sampling unit 601E outputs 30-bit digital data in parallel.

The digital-to-analog converter 601F converts the digital data output from the sampling unit 601E into an analog signal.

Figure 7:
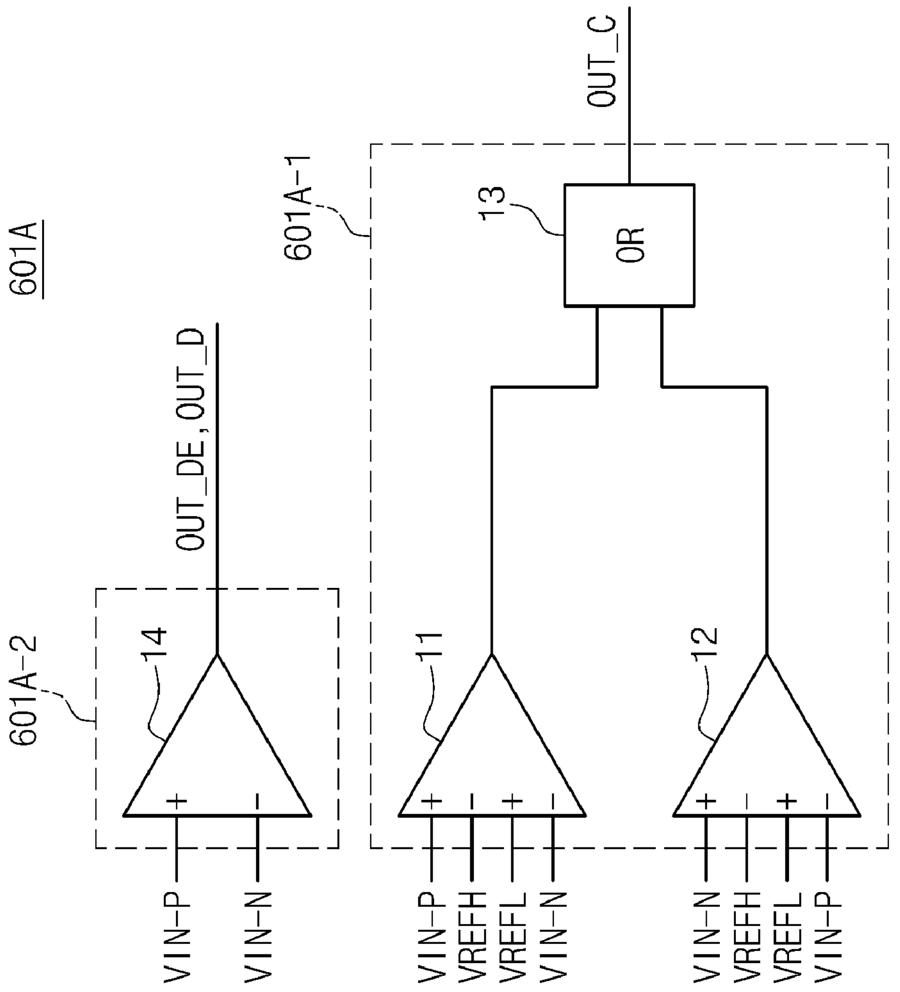
FIG. 7 is a schematic circuit diagram showing an exemplary embodiment of a multi-level detector of the column driver shown in FIG. 6.

FIG. 7 is a schematic circuit diagram showing an exemplary embodiment of the multi-level detector 601A of FIG. 6.

Referring to FIG. 7, as described above in greater detail with reference to FIG. 6, the multi-level detector 601A includes the column clock detector 601A-1 and the image data detector 601A-2.

The column clock detector 601A-1 includes a first comparator 11, a second comparator 12 and an OR operational unit 13.

The first comparator 11 outputs a logic value of "1" when the first voltage VIN-P is greater than the first reference voltage VREFH and the second voltage VIN-N is less than the second reference voltage VREFL. Otherwise, the first comparator 11 outputs a logic value of "0".

The second comparator 12 outputs a logic value of "1" when the second voltage VIN-N is greater than the second reference voltage VREFL and the first voltage VIN-P is less than the second reference voltage VREFL. Otherwise, the second comparator 12 outputs a logic value of "0".

The OR operation unit 13 performs an OR operation on output values received from the first comparator 11 and the second comparator 12 and outputs the result.

Thus, the image data detector 601A-2 compares the first voltage VIN-P and the second voltage VIN-N of the differential swing data DS1, received from the timing controller 60 (FIG. 1), to output the data pulse OUT_D and the data enable pulse OUT_DE having logic values of "0" or "1" according to the comparison result.

In an exemplary embodiment, when the first voltage VIN-P is greater than the second voltage VIN-N, the data pulse OUT_D is output having a logic value of "1". Conversely, when the first voltage VIN-P is less than the second voltage VIN-N, the data pulse OUT_D is output having a logic value of "0". The image data detector 601A-2 according to an exemplary embodiment may be a third comparator 14, as shown in FIG. 7.

As described in greater detail above, the data enable signal DE has a logic value of "0" during the blank period BP. In this case, the column clock CLK, transmitted with the data enable signal DE having a logic value "0", is applied to the image data detector 601A-2 with a voltage identical to, e.g., substantially the same as, the image data RGB-DATA transmitted during the active period AP (best shown in FIGS. 3 and 4). Thus, the image data detector 601A-2 detects the column clock CLK from the differential swing data DS1 during the blank period BP using the third comparator 14 shown in FIG. 7. As a result, the image data detector 601A-2 determines, e.g., distinguishes, the column clock CLK received with the data enable signal DE(0) having a logic value of "0" as a clock signal from the image data RGB-DATA.

In an exemplary embodiment, the multi-level detector 601A may further include a buffer unit (not shown) which compares and buffers input signals. The buffer unit may buffer the input signals to output the first voltage VIN-P and the second voltage VIN-N. The first voltage VIN-P and the second voltage VIN-N are thereafter supplied to the column clock detector 601A-1 and the image data detector 601A-2.

The timing controller 60 (FIG. 1) transmits the column clock CLK to the image data detector 601A-2 by increasing a pulse width of the column clock CLK when the blank period BP ends. Thus, the image data detector 601A-2 determines a point at which the blank period BP ends.

More specifically, the timing controller 60 embeds the column clock CLK with a first pulse width during an $(M+1)^{th}$ blank pixel period to an $(M+N-1)^{th}$ blank pixel period, and embeds the column clock CLK with a second pulse width, greater than the first pulse width, during the $(M+N)^{th}$ blank pixel period. In an exemplary embodiment, for example, the second pulse width may be approximately twice the first pulse width. The column clock CLK having the second pulse width detected by the image data detector 601A-2 is applied to the internal clock generator 601D (FIG. 6). The internal clock generator 601D generates the second internal clock CLK-INT2 corresponding to the $(M+N)^{th}$ blank pixel period by using the column clock CLK having the second pulse width detected from the image data detector 601A-2. As a result, the column drivers CD601 to CD610, which are receive terminals, detect the column clock CLK having the second pulse width to determine the point at which the blank period BP is ended.

As described herein, in the display apparatus 100 according to an exemplary embodiment, the column clock CLK having a voltage identical to a voltage of the image data RGB-DATA is embedded into the blank data Blank-DATA during the blank period BP. Therefore, errors generated when the column driver recovers the column clock CLK embedded during the blank period BP due to the ripple component of the analog supply voltage during the blank period BP are substantially reduced and/or effectively prevented.

The present invention should not be construed as being limited to the exemplary embodiments set forth herein. Rather, these exemplary embodiments are provided so that this disclosure will be thorough and complete and will fully convey the concept of the present invention to those skilled in the art.

Although the present invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A display apparatus comprising:

a timing controller which outputs image data and a first column clock during an active period, the first column clock being embedded into the image data and having a voltage level greater than a voltage level of the image data, and which outputs blank data and a second column clock during a blank period, the second column clock being embedded into the blank data and having a voltage level which is substantially equal to the voltage level of the image data;

a column driver which detects the first column clock and the image data during the active period and converts the image data into a first analog signal using the first column clock, and which detects the second column clock and the blank data during the blank period and converts the blank data into a second analog signal using the second column clock;

a row driver which outputs a scan signal based on a control signal received from the timing controller; and a display unit which displays an image based on the first analog signal, and which displays a black image thereon based on the second analog signal.

2. The display apparatus of claim 1, wherein the timing controller transmits the first column clock during a first period of the blank period.

3. The display apparatus of claim 1, wherein the timing controller and the column driver are connected to each other using a point-to-point connection scheme.

4. The display apparatus of claim 3, wherein the column driver comprises:

a multi-level detector which detects the first column clock during the active period, and which detects the second column clock having the voltage level substantially the same as the voltage level of the image data during the blank period;

an internal clock generator which converts the first column clock into a first internal clock, and which converts the second column clock into a second internal clock;

a sampling unit which performs sampling of the image data received from the multi-level detector using the first internal clock, and performs sampling of the blank data received from the multi-level detector using the second internal clock; and a switching unit which supplies the first column clock to the internal clock generator during the active period and supplies the second column clock to the internal clock generator during the blank period.

5. The display apparatus of claim 4, wherein the multi-level detector detects a data enable signal.

6. The display apparatus of claim 5, wherein the multi-level detector comprises:

a column clock detector which detects the first column clock during the active period; and an image data detector which detects the image data during the active period and which detects the second column clock during the blank period.

7. The display apparatus of claim 6, wherein the switching unit connects an output terminal of the column clock detector to an input terminal of the internal clock generator when the data enable signal has a high logic value during the active period, and which connects an output terminal of the image data detector to the input terminal of the internal clock generator and an input terminal of the sampling unit when the data enable signal has a low logic value, relative to the high logic value, during the blank period.

8. The display apparatus of claim 1, wherein the image data comprises a first voltage having a positive polarity and a second voltage having a negative polarity.

9. The display apparatus of claim 8, wherein the first column clock comprises a third voltage greater than the first voltage of the image data and less than the second voltage of the image data.

10. The display apparatus of claim 9, wherein the timing controller outputs a data enable signal that has a high logic value during the active period, and has a low logic value relative to the high logic value during the blank period, and the active period and the blank period are determined based on the data enable signal.

11. The display apparatus of claim 10, wherein the timing controller transmits the first column clock, the data enable signal having the high logic value and the image data to the column driver in a data stream format during the active period.

12. The display apparatus of claim 11, wherein the timing controller transmits the second column clock, the data enable signal having the low logic value and the blank data to the column driver in a data stream format during the blank period.

13. The display apparatus of claim 8, wherein the second column clock comprises the first voltage and the second voltage.

14. A method of driving a display apparatus, the method comprising:

generating image data and a first column clock during an active period, the first column clock being embedded into the image data and having a voltage level greater than a voltage level of the image data, and generating blank data and a second column clock during a blank period, the second column clock being embedded into the blank data and having a voltage level substantially the same as the voltage level of the image data;

detecting the image data and the first column clock during the active period;

detecting the blank data and the second column clock during the blank period;

converting the image data into a first analog signal using the first column clock during the active period;

converting the blank data into a second analog signal using the second column clock during the blank period;

displaying an image in response to the first analog signal; and displaying a black image in response to the second analog signal.

15. The method of claim 14, wherein the timing controller transmits the first column clock during a first period of the blank period.

16. The method of claim 14, wherein the image data comprises a first voltage having a positive polarity and a second voltage having a negative polarity.

17. The method of claim 16, wherein the first column clock comprises a third voltage greater than the first voltage of the image data and less than the second voltage of the image data, and the second column clock comprises the first voltage of the image data and the second voltage of the image data.

18. A display apparatus comprising:

a timing controller which outputs a first column clock and image data corresponding to an image during an active period in which the image is displayed, the first column clock being embedded into the image data and having a voltage level greater than a voltage level of the image data, and which outputs blank data and a second column clock during a blank period in which the image is not displayed, the second column clock being embedded into the blank data;

a column driver which detects the first column clock and the image data during the active period and converts the image data into a first analog signal using the first column clock, and which detects the second column clock and the blank data during the blank period and converts the blank data into a second analog signal using the second column clock;

a row driver which outputs a scan signal in response to a control signal of the timing controller; and a display unit which displays the image in response to the first analog signal, and which displays a black image in response to the second analog signal, wherein levels of the first column clock and the second column clock are different.

19. The display apparatus of claim 18, wherein a voltage level of the second column clock substantially the same as the voltage level of the image data.

20. The display apparatus of claim 19, wherein the column driver comprises:

a multi-level detector which detects the first column clock during the active period, and which detects the second column clock during the blank period;

an internal clock generator which converts the first column clock into a first internal clock, and which converts the second column clock into a second internal clock;

a sampling unit which performs sampling on the image data received from the multi-level detector using the first internal clock, and which performs sampling on the blank data received from the multi-level detector using the second internal clock; and a switching unit which supplies the first column clock to the internal clock generator during the active period and supplies the second column clock to the internal clock generator during the blank period.

* * * * *